United States Patent
Yopp et al.

(10) Patent No.: US 9,524,482 B2
(45) Date of Patent: Dec. 20, 2016

(54) RETAIL SPACE PLANNING SYSTEM

(71) Applicant: Oracle International Corporation, Redwood Shores, CA (US)

(72) Inventors: John Yopp, Minneapolis, MN (US); Charles Pilon, Saint Paul, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 217 days.

(21) Appl. No.: 14/334,928

(22) Filed: Jul. 18, 2014

(65) Prior Publication Data

US 2016/0019717 A1 Jan. 21, 2016

(51) Int. Cl.
*G06F 3/048* (2013.01)
*G06Q 10/06* (2012.01)
*G06F 3/01* (2006.01)
*G06T 19/20* (2011.01)

(52) U.S. Cl.
CPC ............ *G06Q 10/067* (2013.01); *G06F 3/011* (2013.01); *G06T 19/20* (2013.01); *G06T 2219/2004* (2013.01); *G06T 2219/2021* (2013.01)

(58) Field of Classification Search
CPC ................................ G06F 3/011; G06T 19/20
See application file for complete search history.

(56) References Cited

U.S. PATENT DOCUMENTS

| | | | | |
|---|---|---|---|---|
| 6,563,520 B1 * | 5/2003 | Parker | ..................... | G06F 3/011 715/771 |
| 6,803,928 B2 * | 10/2004 | Bimber | ................ | G05B 19/186 345/419 |
| 7,788,071 B2 * | 8/2010 | Bond | ..................... | A63F 13/10 703/6 |
| 8,321,797 B2 | 11/2012 | Perkins | | |
| 8,639,440 B2 | 1/2014 | Nicholson | | |
| 8,847,989 B1 * | 9/2014 | Berme | ..................... | G09G 5/12 345/633 |
| 2001/0025261 A1 * | 9/2001 | Olefson | ................. | G06Q 50/16 705/313 |
| 2001/0047251 A1 | 11/2001 | Kemp | | |
| 2002/0010734 A1 * | 1/2002 | Ebersole | ................. | H04L 29/06 709/201 |
| 2002/0156703 A1 * | 10/2002 | Abekawa | ............... | G06Q 30/02 705/26.61 |

(Continued)

OTHER PUBLICATIONS

"Eon Space Planner", http://www.eonreality.com/eon-space-planner/, last downloaded on Jul. 18, 2014.
red dot square solutions, "Tesco leaps into the future with Virtual Reality Software in partnership with Red Dot Square", http://www.reddotsquare.com/news/show/tesco-leaps-into-the-future-with-virtual-reality-software-in-partnership-with-red-dot-square-2/, last downloaded on Jul. 18, 2014.

(Continued)

*Primary Examiner* — Omar Abdul-Ali
(74) *Attorney, Agent, or Firm* — Miles & Stockbridge P.C.

(57) ABSTRACT

A three dimensional virtual retail space representing a physical space for designing a retail store space layout is provided. A three dimensional virtual object representing at least one physical object for the retail space is provided. Input can be received from a virtual reality input interface for interacting with the virtual object in the virtual retail space. Based on the input, the virtual object can be placed in the virtual retail space. An updated video signal can be sent to a head mounted display that provides a three dimensional representation of the virtual object in the virtual space.

21 Claims, 6 Drawing Sheets

(56) References Cited

U.S. PATENT DOCUMENTS

| | | | |
|---|---|---|---|
| 2006/0161572 A1* | 7/2006 | Vogt | G06T 13/20 |
| 2006/0277119 A1* | 12/2006 | Tung | G06Q 30/06 |
| | | | 705/26.2 |
| 2008/0043013 A1* | 2/2008 | Gruttadauria | G06Q 30/02 |
| | | | 345/419 |
| 2008/0162262 A1* | 7/2008 | Perkins | G06Q 30/02 |
| | | | 715/757 |
| 2009/0322671 A1 | 12/2009 | Scott et al. | |
| 2012/0223943 A1* | 9/2012 | Williams | G06T 19/20 |
| | | | 345/419 |
| 2013/0346032 A1* | 12/2013 | Trabona | G06F 17/5004 |
| | | | 703/1 |
| 2015/0248228 A1* | 9/2015 | Seuntiens | H05B 37/029 |
| | | | 715/765 |
| 2015/0356774 A1* | 12/2015 | Gal | G06F 17/50 |
| | | | 345/633 |

OTHER PUBLICATIONS

"6 Interior Design Apps Offer Help With a Swipe", http://www.apartmenttherapy.com/6-home-design-apps-weekly- smartphone-app-roundup-167368, last downloaded on Jul. 18, 2014.

Janne Porkka et al., "Increased Interaction with Multi-User Virtual Reality in Construction Projects", http://cic.vtt.fi/jporkka/Janne__Porkkas_site/Publications_files/CONVR_2012_paper_Porkka_et_al_FINAL-.pdf, last downloaded on Jul. 18, 2014.

Oracle Data Sheet, "Oracle Retail Macro Space Management", http://www.oracle.com/us/products/applications/retail/merchandise-planning/macro-space/overview/index.html?ssSourceSiteId=ocomde, last downloaded Jul. 18, 2014.

\* cited by examiner

US 9,524,482 B2

RETAIL SPACE PLANNING SYSTEM

FIELD

One embodiment is directed generally to a computer system, and in particular to a computer system for retail space planning.

BACKGROUND INFORMATION

Retail store space designers have traditionally laid out the placement of fixtures and items within the store using software that displays the design layout in two dimensions on a computer screen. However, customers and others may have difficulty envisioning what the final result would be when physically built out. Some solutions have been developed to better communicate a design layout to customers and others. One solution is to provide a three dimensional ("3D") perspective rendering of the space in space planning software so that the retail space looks like a photograph and includes perspective views of the space from different angles. The view inside such 3D perspective renderings can be altered as if a camera were panning and moving through the space. Another solution involves purpose-built, high-end facilities that can animate the space so that users can view the space on large monitors to simulate an immersive experience that a user can walk through. Another solution involves purpose-built mock up physical facilities so that designers can walk through the physical space.

SUMMARY

In one embodiment, a three dimensional virtual retail space representing a physical space for designing a retail store space layout is provided. A three dimensional virtual object representing at least one physical object for the retail space is provided. Input can be received from a virtual reality input interface for interacting with the virtual object in the virtual retail space. Based on the input, the virtual object can be placed in the virtual retail space. An updated video signal can be sent to a head mounted display that provides a three dimensional representation of the virtual object in the virtual space.

DETAILED DESCRIPTION

One embodiment provides a three dimensional virtual retail space representing or modelling a physical space and 3D virtual objects representing or modelling physical objects in the real world. Such objects can include, for example, shelves or other fixtures, items to go on the shelves, lighting, displays, structures, flooring, information displays, checkout lanes, cash registers, and so forth. A user can wear a virtual reality headset and view the virtual space. The user can interact with virtual objects to move them around the retail space or arrange them in a particular way. As the user interacts with the virtual objects, the display is updated to give the user the sense that the user is actually manipulating and interacting with the objects in a physical way. Sensors, cameras, microphones, or other input devices can be used to determine the user's movement and translate the movement into an interaction or translate the movement into a perspective change, such as when the user moves the user's head or when the user walks around the virtual space. The user can use the system to design and plan a retail space.

Figure 1:
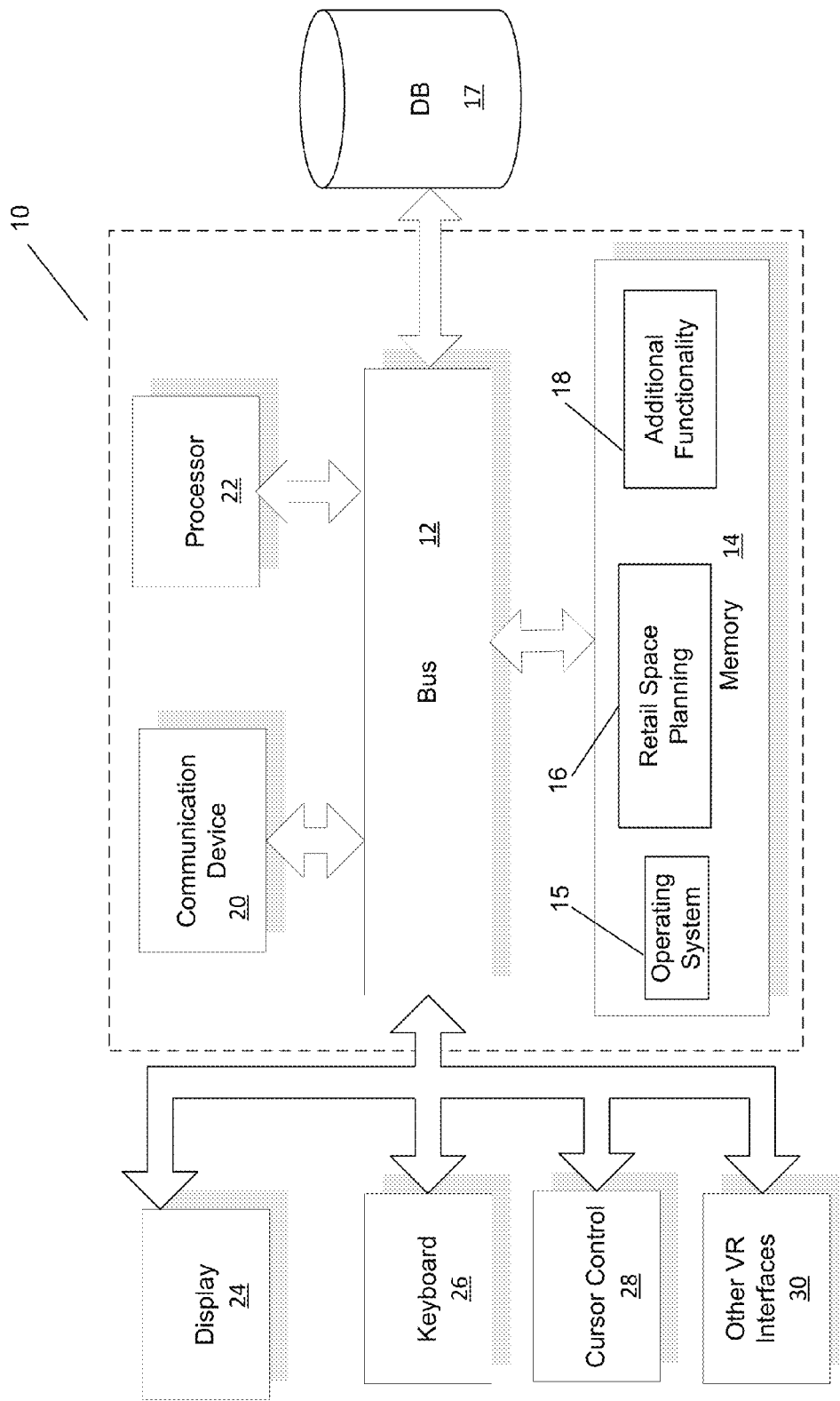
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD") or a head mounted display, such as the "Oculus Rift" by Oculus VR, Inc., "Personal 3D HDTV Viewer" by Sony Corporation, or "Project Morpheus" also by Sony Corporation. A keyboard 26 and a cursor control device 28, such as a computer mouse, can be further coupled to bus 12 to enable a user to interface with system 10. Other interface devices 30, coupled to processor 22, and are particular to virtual reality systems. Described in greater detail below, these devices can include depth perceiving cameras, microphones, motion tracking gloves, infrared sensors, and the like.

In one embodiment, memory 14 stores software modules that provide functionality when executed by processor 22. The modules include an operating system 15 that provides operating system functionality for system 10. The modules further include a retail space planning module 16 that provides and processes space planning data, as disclosed in more detail below. System 10 can be part of a larger system, such as a retail space and merchandise planning system. Therefore, system 10 will typically include one or more additional functional modules 18 to include the additional functionality. In one embodiment, additional functionality 18 can be provided by an iteration of "Oracle Retail Macro Space Management" by Oracle Corp. In some embodiments, additional functionality 18 can include a merchandising system that includes merchandising information about products used in the 3D representations or models. A database 17 is coupled to bus 12 to provide centralized storage for modules 16 and 18 and store one or more data sets to support contextual data processing, etc. Some embodiments may not include all of the elements in FIG. 1.

Retail space planning can be used to lay out a store selling goods or services prior to investing in actual fixtures and build out of retail space. As web shopping increases in popularity, physical store retailers may want to provide a unique experience to customers to compete against web retailers. Embodiments allow designers to plan their retail space through immersive virtual reality gear and to use the same gear to verify that their new concepts are compelling to customers.

Known solutions that incorporate 3D planning and design do not allow planning and design in any kind of immersive way. Immersive mock-ups may be available to view, however alteration is not practical because such systems lack the capability to alter or change any of the existing designs, nor do they have the capability of accepting input from virtual reality interfaces to allow alteration of the design. Embodiments consistent with the present invention allow a user to design a space by entering a virtual reality planning session that allows users to review and design spaces, such as retail spaces, while immersed within the virtual world.

Figure 2:
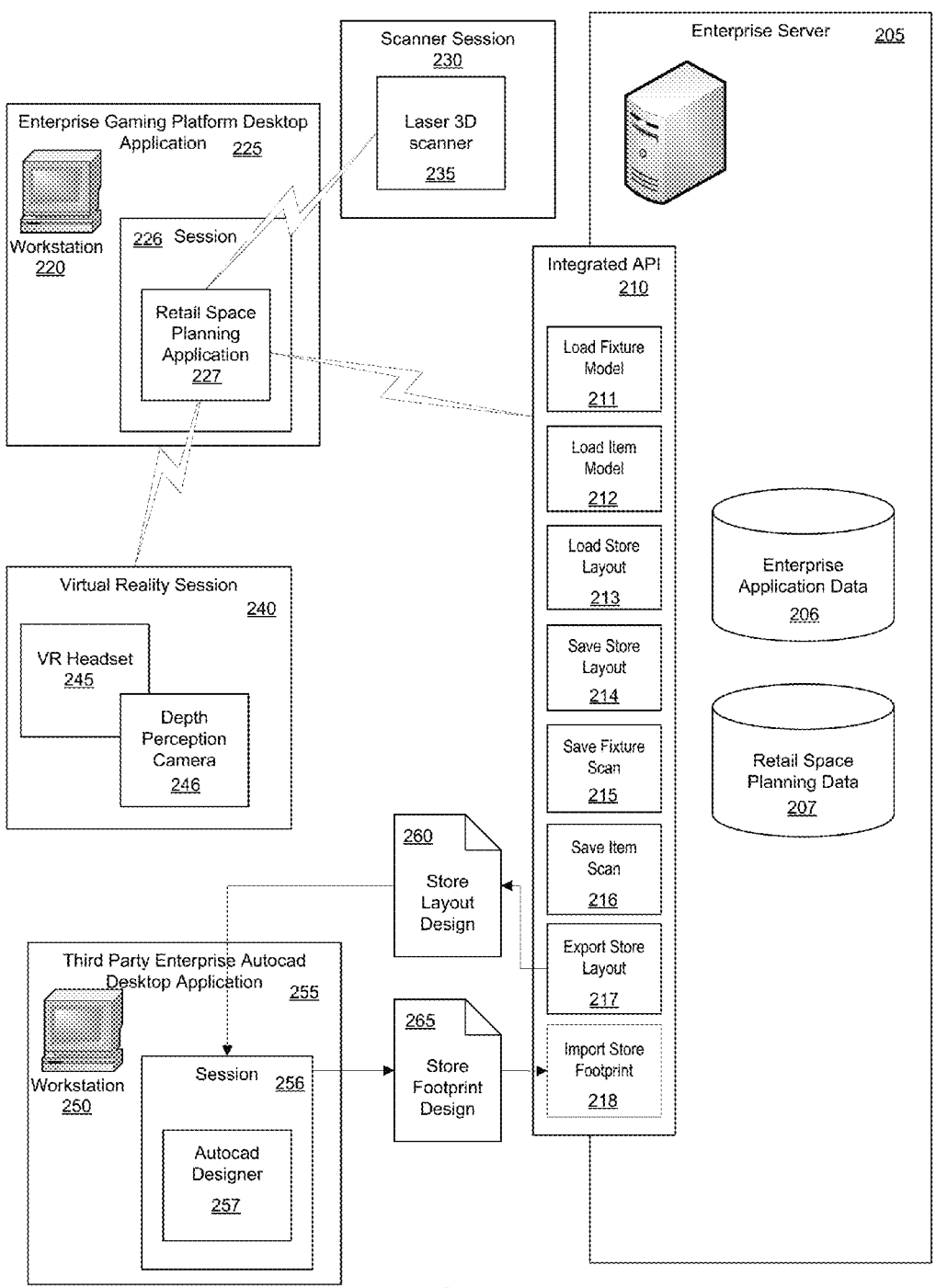
FIG. 2 is a block diagram of a retail space planning system in accordance with some embodiments.

FIG. 2 is a block diagram of a retail space planning system 200 in accordance with some embodiments. An enterprise server 205 stores enterprise application data 206 and retail space planning data 207. Enterprise application data 206 stores information for enterprise applications tied to the retail space planning system. Retail space planning data 207 stores information related to the 3D planning fixtures and item models as well as information about space planning projects. Server 205 also contains an integrated application programming interface ("API") 210 with API modules for interfacing with other components of retail space planning system 200. API module Load Fixture Model 211 allows a fixture object 3D representation or model to be loaded into retail space planning system 200. API module Load Item Model 212 allows an item object 3D representation or model to be loaded into retail space planning system 200. API module Load Store Layout 213 allows a store layout 3D representation or model to be loaded into retail space planning system 200 from future reality data store 207. Fixture objects and item objects can be loaded as part of providing available base objects for a user to work with to build out the store layout. Store layouts can contain information about the store including room layouts, fixture selection and placement, and item selection and placement.

API module Save Store Layout 214 can save the current store layout to retail space planning data store 207. API module Save Fixture Scan 215 can integrate with object scanning technologies to allow a fixture to be scanned using cameras, infrared, or laser technology to develop a 3D representation or model for use in retail space planning system 200. Scan information from fixture scan module 215 can be stored in retail space planning data store 207. API module Save Item Scan 216 can integrate with object scanning technologies to allow an item to be scanned just as a fixture could be scanned to develop a 3D representation or model for use in retail space planning system 200. Scan information from item scan module 215 can be stored in retail space planning data store 207. API module Export Store Layout 217 can be used to export the store layout stored in retail space planning data store 207 into a standard 3D file type for later importing into a 3D modeling program such as a third party automated computer aided design ("AutoCAD") desktop application. API module Import Store Footprint 218 can be used to import store footprint information from a standard 3D file type into retail space planning system 200.

A workstation 220 can execute an enterprise gaming platform desktop application 225 for interacting with server 205 and designing spaces using APIs 210. A user can start a planning session 226 that runs a retail space planning application 227 for designing retail spaces. As well as accessing server 205 through APIs 210, retail space planning application 227 can process information from a scanner session 230 that uses a laser 3D scanner (or other 3D scanning technology) 235 to scan objects for loading into fixture and item 3D model databases. Retail space planning application 227 can also process information to and from a virtual reality session 240 by causing a virtual reality headset display 245 to display 3D images to a viewer and by using a depth perception camera or other movement tracking technology 246 to track a user of the system and the user's interactions with system 200.

A workstation 250 can run a third-party enterprise AutoCAD desktop application 255 for working with 3D models outside of a virtual reality retail planning space system. Application 255 can run session 256 with an AutoCAD designer application. Session 256 can use APIs 210 and in particular export store layout API 217 to cause a 3D file from system 200 to be exported to store layout design file 260. Store layout design file 260 can be imported into session 256 and design software 257. Session 256 can use import store footprint API 218 by exporting a store footprint design into a 3D design file 265 in a format to be imported into system 200 and stored in retail space planning data store 207. Store footprint design file 265 can contain 3D model information about the store, such as footprint shape, wall placement, electrical placement, and plumbing fixtures.

Figure 3:
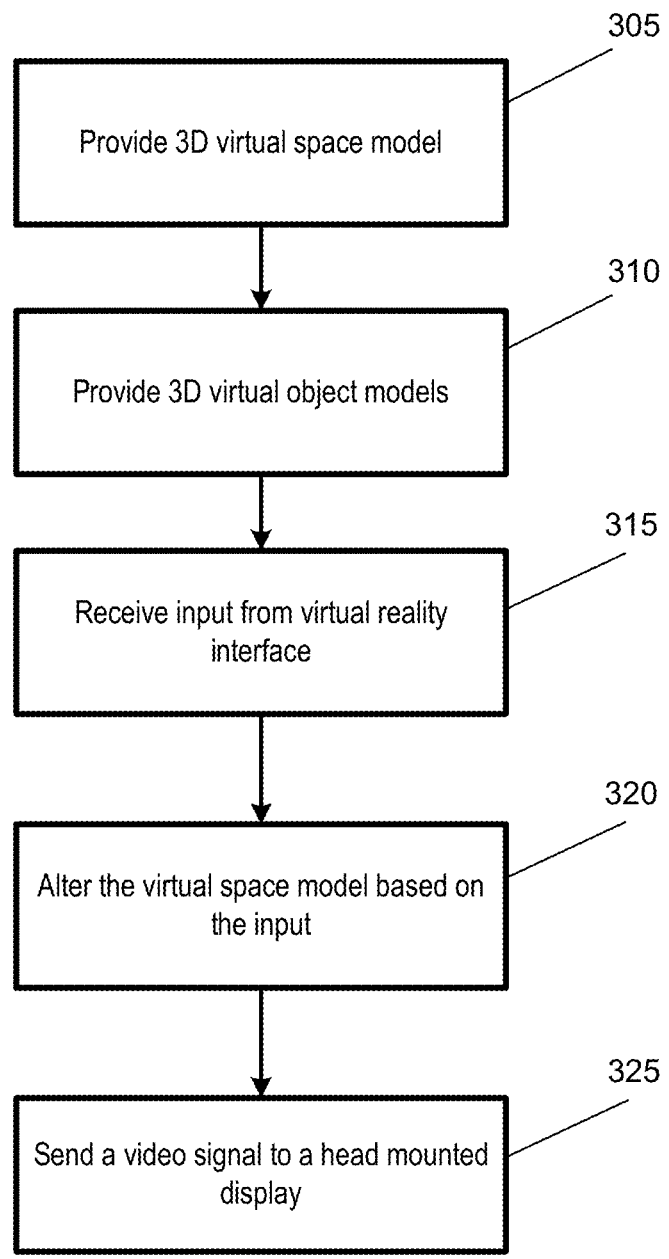
FIG. 3 is a flow diagram illustrating a retail space planning and design session in accordance with some embodiments.

FIG. 3 is a flow diagram illustrating a retail space planning and design session 240 in accordance with some embodiments. In one embodiment, the functionality of the flow diagram of FIG. 3 (and of FIGS. 4-7, below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 305, a 3D virtual retail space is provided for planning. For example, a base retail space representation or model can be loaded into system 10. The base model can represent a retail space for designing. Once loaded, the base model can be altered by the user as appropriate for the space that is to be designed. In some embodiments, a 3D model file can be imported from another 3D modeling program or opened from a previously saved planning session. Likewise, in some embodiments, the user can save or export the designed 3D model into an industry standard format that could be loaded into other 3D planning software.

At 310, 3D virtual object models are provided. 3D virtual object models can include any type of object or fixture placed in the planning model. Some examples include lighting, flooring, wall coverings, cabinets, shelves, display cases, display racks, furniture, products, carousels, checkout lanes, registers, mannequins, people, machinery, vending machines, and so forth. Anything that exists in the physical world can be available as a 3D virtual object model. 3D virtual object models can be available in a library readily available to the user of system 10. 3D virtual object models can be imported from other 3D modeling programs. 3D virtual object models can be loaded from a previously saved planning session and arranged as they were when the planning session was previously saved.

In some embodiments, cameras can be used to automatically create a new 3D virtual object. For example, an object can be brought to a depth perceiving camera system or laser profiler and by known means the camera or laser can be used to take pictures of or profile the object and then render a 3D model of the object for direct importing into the planning session. Known solutions to provide 3D models of real-world objects include the software "Skanect" from Occipital Corp.

At 315, 3D input is received from virtual reality interface 30. The input can come from a depth perceiving camera, microphone, infrared sensor, motion tracking wands or gloves, or other motion tracking technology, such as a device similar to the "Kinect" by Microsoft Corporation, the "Leap Motion Controller" by Leap Motion, Inc., or the "Occipital Structure Sensor" by Occipital Corp. The input can typically represent an action of the user in the 3D virtual retail planning space. For example, the user can select a fixture, such as a shelf, and place it in the retail planning space. The user can manipulate the object to stretch it or compress it by gripping the sides and moving the user's hands apart or together, respectively. Alternatively, the user can change the size of an object by making a certain gestures, such as selecting the object, placing hands together, and slowly moving the hands apart, with the distance between hands controlling the extent of growth of the object.

Known gaming systems that support immersive virtual reality gaming can be altered without undue experimentation to support the planning session. Gaming Software Development Kits ("SDKs"), such as "Unreal Development Kit" by Epic Games, Inc. or "Unity" by Unity Technologies, can be leveraged to create the graphical interaction of the virtual objects in the virtual space. For example, to provide additional visual feedback to the user, parts of the user's body can also be modeled in the retail planning space. Thus, as a user manipulates an object, the user can receive the visual feedback of seeing a virtual model of the user's hand pick up the object and move it or alter it. The visual feedback can make the virtual reality experience more natural.

In some embodiments, the input can be a microphone that picks up user voice commands and uses natural language processing to interpret the voice commands into commands to control system 10. For example, a user can manipulate an object by selecting the object and ordering the object to rotate, grow, shrink, or otherwise alter its appearance. The user can also tag objects with labels and categories using voice commands. The user can also interact with the program to import other objects, multiply objects, or remove objects from the planning session.

In some embodiments, the input source can come from a motion sensor or position sensor in a head mounted display while in other embodiments, sensor input from a head mounted display can be additional separate input. Those skilled in the art will understand that multiple inputs can be used by system 10 simultaneously.

At 320, the virtual space model is altered based on the input. In response to the input, the planning session will be altered in some way. If the user is manipulating objects, then the color, size, shape, or appearance of the object may change. If the user is manipulating the retail planning space, then the user can add or remove walls and other fixtures. If the user's head is moving, for example panning the retail planning space, then the video shown in a head mounted display can be updated to change the camera angle in the virtual 3D retail planning space according to the input received from a motion and position sensor in the head mounted display.

At 325, a video signal is sent to the head mounted display reflecting the alteration. Nearly simultaneously with the user's manipulation of the virtual object, system 10 calculates the change made to the virtual world based on inputs received from the sensors and updates the planning model, and then updates the display by sending a video signal to the head mounted display that reflects the alterations. Thus, when a user alters the color or appearance of an object, the user receives immediate visual feedback that the alterations were processed.

The user can repeat the flow of 305-325 to fully design the space. For example, the user can place products on shelves to determine how to maximize the space available.

Figure 4:
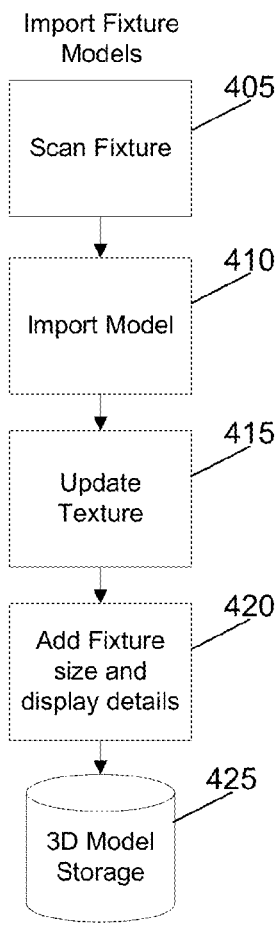
FIG. 4 is a flow diagram illustrating importing fixtures in accordance with some embodiments.

FIG. 4 is a flow diagram illustrating importing fixtures in accordance with some embodiments. At 405, a fixture is scanned using any available scanning technology. Laser scanners can provide a detailed texture map of an object. Depth perceiving cameras can take multiple shots of an object and generate a 3D frame of an object by extracting edges and combining multiple shots of the object. Other systems can use infrared or ultrasound to profile objects for rendering into 3D.

At 410, a 3D model of the fixture is imported into system 10. At 415, the texture of the fixture is updated to produce variants. For example, a shelf can be scanned and the texture manipulated to represent wood or metal materials for the shelf. Texture can also include the finish of the fixture's surface. For example, a metal shelf can be finished smoothly or roughly to provide more static friction to items resting on the shelf. Some items may be more appropriate to put onto smooth shelves. Texture can also include the color of the fixture.

At 420, fixture size and display details are added. Size details include length, depth, and height details. Fixture details can include how fixtures interconnect with each other. In some embodiments, for some types of fixtures, details can also include configurable properties of the fixture. For example, a shelf may have adjustable shelves or a display may have adjustable peg hooks for merchandise. In some embodiments, textures can also include small variations on the fixtures. For example, the location or size of a price tag can be configured, such as when the price tag is located at the edge of the shelf or at the end of a merchandise peg. At 425, the 3D model is stored.

Figure 5:
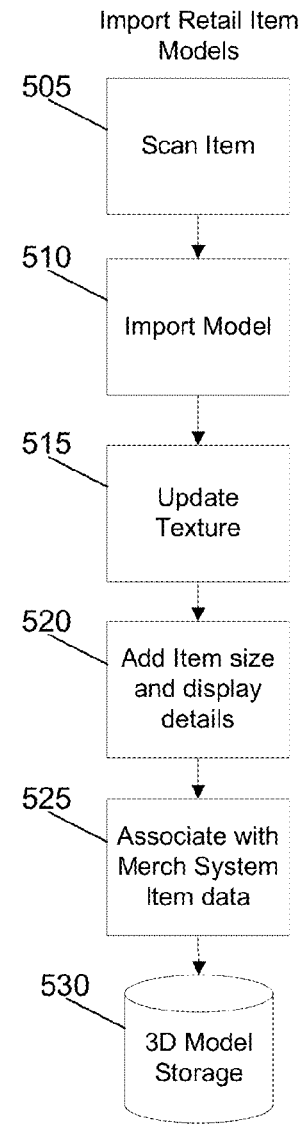
FIG. 5 is a flow diagram illustrating importing retail items in accordance with some embodiments.

FIG. 5 is a flow diagram illustrating importing retail items in accordance with some embodiments. At 505, an item is scanned using any available scanning technology just as in 405. However, because items may typically be smaller than fixtures, some technologies may be more readily available for scanning items. For example, item scanning may be able to accomplished using a single-lens camera and taking multiple pictures for the 3D renderer to use. At 510, a 3D model of the item is imported into system 10. At 515, the texture of the item is updated to produce variants. For example, certain manufacturers may produce items in standard sizes. A texture can be applied to a single item of the standard size to represent the multiple items. One particular example may be cereal boxes. A manufacturer may make several types of cereal all sharing the same size box with different imprints. Each box type can be a different texture. Other texture options may include whether the item is rigid like a box or flexible like a bag.

At 520, item size and display details are added. Size details include length, depth, and height details. Item display details can include how items fit on shelves of different standard sizes, or whether they are cylindrical, stackable, rigid, flexible, have a high resistance to crushing, and so forth. At 525, in some embodiments, items are associated with a merchandise system that can be part of system 10 as part of additional functionality 18. At 530, the 3D model is stored.

Figure 6:
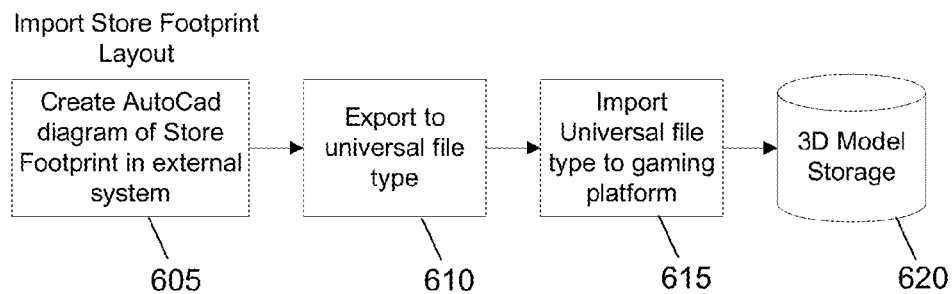
FIG. 6 is a flow diagram illustrating the importing of a store footprint layout in accordance with some embodiments.

FIG. 6 is a flow diagram illustrating the importing of a store footprint layout in accordance with some embodiments. At 605, a diagram of a store layout is created in some 3D modeling program such as an AutoCAD capable program in an external system. At 610, the diagram is exported to a universal 3D modeling file type in the external system. At 615, the universal file type is imported into system 10 which can be based on a virtual reality gaming platform. At 620, the 3D model is stored.

Figure 7:
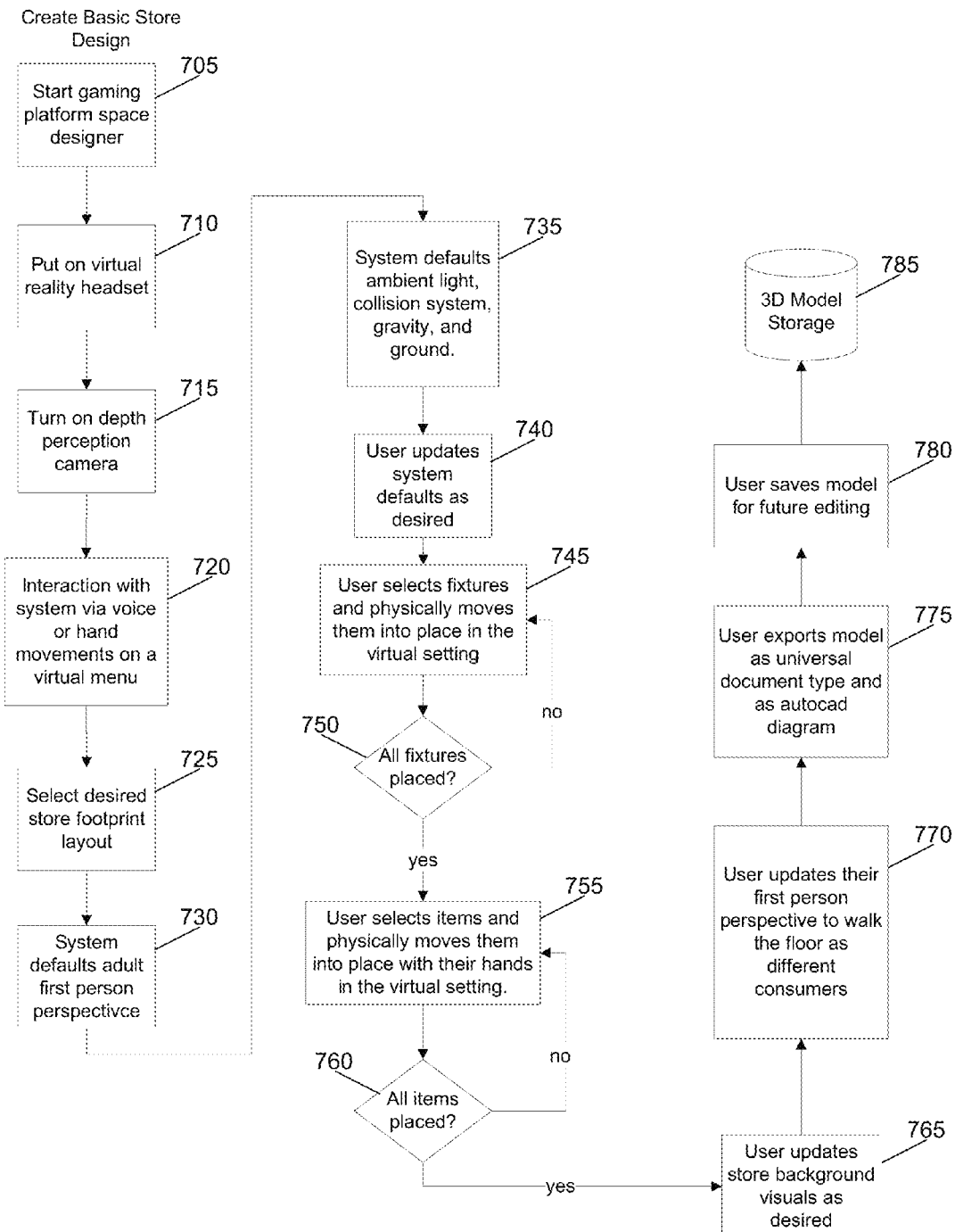
FIG. 7 is a flow diagram illustrating creating a basic store design in accordance with some embodiments.

FIG. 7 is a flow diagram illustrating creating a basic store design in accordance with some embodiments. At 705, gaming platform space designer 225 is started. The space designer platform can be based on a virtual reality gaming platform. At 710, the user would put on virtual reality headset 245. At 715, a depth perception camera 246 or other motion tracking technology would be turned on. At 720, a virtual menu system can be displayed in the headset to provide the user one way to interact with the system. At 725, the user can select a desired store footprint layout from a previously saved file or from a list of generic library store layout designs. At 730, the system loads the file and provides a 3D rendered first person perspective to the user via the headset. The system can place the visual perspective from a default height level or can use an approximated height level based on biological data about the user, such as previously entered height information or approximated height information from the depth perceiving camera.

At 735, the system can default ambient light settings, a collision system, gravity, and a ground or floor. In other words, the physical laws of the virtual reality retail planning space are set. For example, gravity could be defaulted to the same gravitational force as Earth, or it could be set to zero gravity if designing a space to be used in space. In another example, a collision system can provide rules for what happens when the user comes in virtual contact with the items and fixtures in the retail planning space. The collision system may allow a user to move fixtures by virtual contact or could prevent users from moving them. Collision and gravity can be changed dynamically so that fixtures can be lighter and easier to move and then changed again to make them act as they would in real life, resisting most benign contact from altering their position. At 740, a user can update the default settings as appropriate and as desired for what the user plans on doing in the retail planning session.

At 745, the user can place fixtures in the retail planning space. The user can move around existing fixtures or can add fixtures from a bank of available fixture types. The user can delete fixtures as well. At 750, if all fixtures are placed, then the flow will continue to 755, otherwise, the flow goes back to 745 to determine if all fixtures are placed. At 755, the user can select items and move them into place with virtual hands by mimicking the same movement physically. Motion sensors and cameras can detect the user's physical movement and relate that movement to the movement of virtual hands in the virtual retail planning space to manipulate and interact with the items. At 760, if all items are placed, the flow will continue to 765, otherwise the flow will go back to 755 to place additional items in the space.

At 765, the user updates the store background visuals if desired. The user can also go back and adjust fixtures, including shelf locations, lighting, flooring, and the like. The user can also go back and adjust items as desired. At 770, the user can update the perspective to walk the floor as different consumers. As the retail space is planned, the user can move through the space in the virtual reality as if the user were actually in the space. In some embodiments, the user can take on a particular perspective and view the space from that perspective. For example, the user can view the retail space from a perspective of a person in a wheel chair or electronic cart, a child in a shopping cart, or a person who has other accessibility needs.

At 775, the user can export the store model as a universal document type and as 3D drawings. For example, the user can export different 'views' of the store as standard flat graphic images. The user can export video of a camera moving through the retail space. The user can export wireframes of the same. The user can export 3D drawing files such as an AutoCAD compatible file. At 780, the user can save the model for future editing. At 785, the saved file can be stored in 3D model storage. One of ordinary skill in the art will understand that the flow of FIG. 7 can be exited and entered at almost any point. The design process does not have to follow the flow explicitly, but can loop back and revisit program settings and other interaction with the 3D model dynamically.

The user can be a designer of the planning space or can be a customer that can review the planned space or provide input about the planning space. The equipment needed to interact in the planning space is relatively inexpensive and is accessible, as compared to creating a physical mock-up of a space. A designer or customer can be immersed in the view from practically any location. Other users can use system 10 to view and interact with the planning space for any number of reasons.

In some embodiments users can utilize virtual reality equipment to enter a virtual store with representations of virtual objects for sale and actually purchase real-life counterparts to the virtual objects. The virtual store can be provided as a part of a larger virtual world, as a downloaded interface for customers, or as a service within a physical store for "endless aisle" access to products or for customizable products. In some embodiments customers can browse the store virtually as though they were in a standard store, but without the limitations of physical space or local inventory, since one can quickly move to widely disparate points in the store, thus allowing shopping through "endless aisles". Customers can add products to either a viewable shopping cart, such as a virtual shopping cart basket with virtual objects representing the products inside, or a web-like unseen shopping cart that can be accessed and displayed like a webpage as part of a menu interface. Customers can physically place the items in the carts or use a combination of gesture and voice to select the item and any attributes of it, including shipping, color, size, etc.

Payment can be received through either pre-configured electronic payment services, such as PayPal or iTunes, or through scanning a card from the physical world through a built-in camera interface. For fully customizable products, or those that allow for fitting such as clothing, once the attributes are chosen, in some embodiments customers can see the item, and can also see the item reflected in a virtual mirror. Customers can view how they would look in the item in the mirror, including turning themselves around and viewing from different angles. In some embodiments, customers can adjust the view of the virtual reality display to view their virtually represented self from other angles without a virtual mirror. Customers' virtual representations can be created by scanning themselves to create 3D models textured with a graphical representation of the customers' image, and then importing that model. The model can also be saved for future use.

Figure 8:
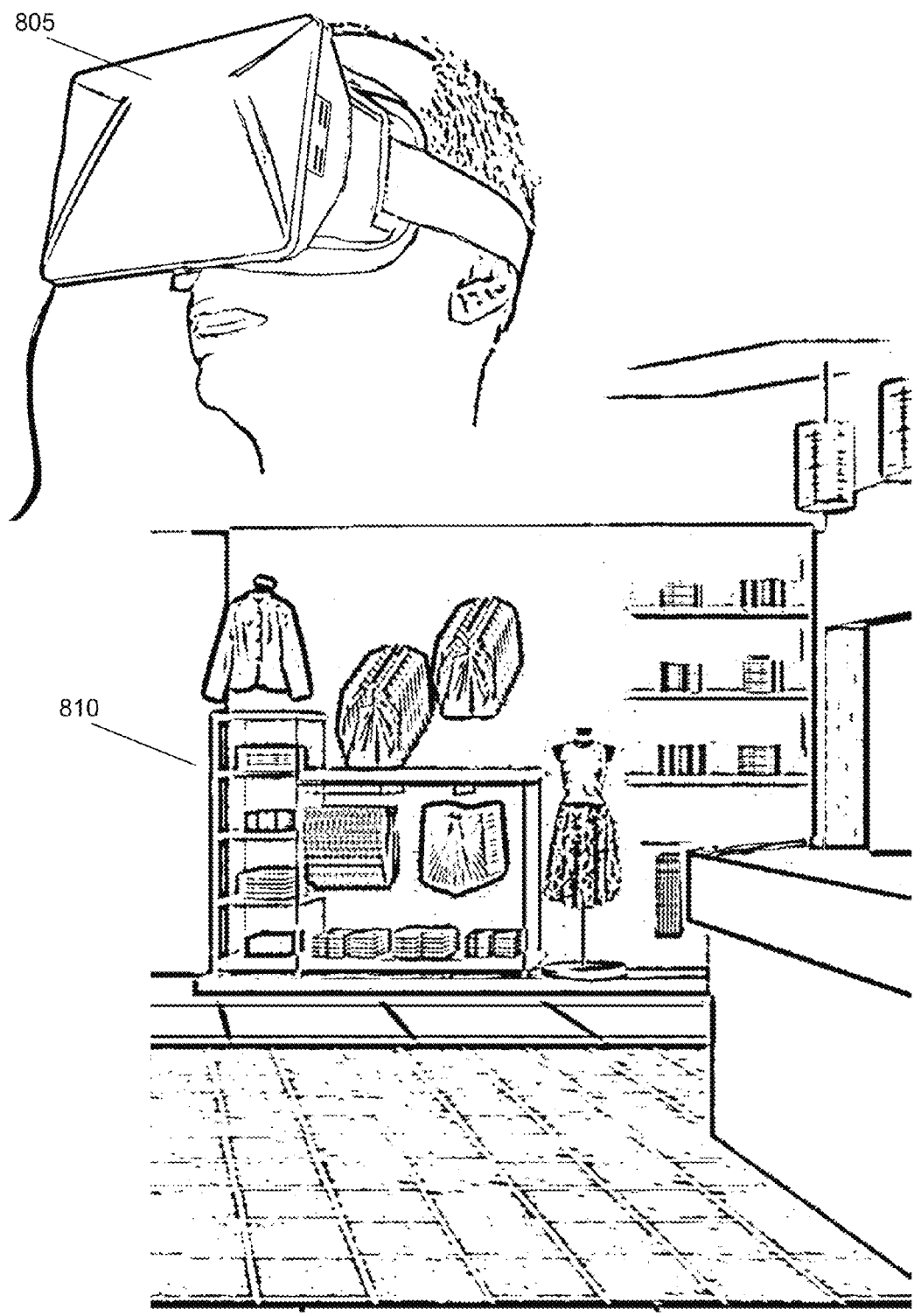
FIG. 8 illustrates retail space planning in accordance with some embodiments.

FIG. 8 illustrates retail space planning in accordance with some embodiments. An Oculus Rift head mounted display 805 can be worn so as to be completely immersive, blocking out any other visual sensory input. Headphones can be added to receive auditory cues and information as well. One view of what might be viewed by a user by headset 805 is at 810, which demonstrates a view of a store display wall that includes racks of clothes, shelves, wall units, lighting, flooring, and a checkout counter.

As disclosed, embodiments provide a 3D virtual reality space for a retail space planning session in the planning and design of a physical counterpart retail space in the real world. Three dimensional models of items and fixtures are also provided in the planning session. The virtual reality gear used to interact with the virtual space receives inputs that represent the interactions and gestures of the user. The model of the virtual space is altered or changed based on the input received. Objects and fixtures may be placed or altered. The "view" as perceived by the user can be altered. A video signal is sent to the user's head mounted display representative of the change. By repeating this flow, the virtual retail space can be planned as a virtual mock-up or design of a planned actual physical retail space.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of designing a retail store space layout comprising:
providing a three dimensional (3D) virtual retail space viewable through a head mounted virtual reality display, the three dimensional virtual retail space being created from a store footprint corresponding to a retail store space layout;
providing a fixture object 3D representation or model within the three dimensional virtual retail space, the fixture object 3D representation or model being movable or editable;
receiving a first user interaction with the fixture object 3D representation or model within the three dimensional virtual retail space, the first user interaction resulting in the fixture object being placed, removed, or altered; and
sending an updated video signal to the head mounted virtual reality display that displays a result of the first user interaction within the three dimensional virtual retail space.

2. The method of claim 1, further comprising:
receiving a second user interaction, the second user interaction corresponding to movement of the virtual reality display; and
updating the video signal based on the second user interaction.

3. The method of claim 1, further comprising:
providing a 3D virtual person that represents at least part of a person wearing the head mounted display within the three dimensional virtual retail space.

4. The method of claim 3, wherein the virtual person includes details of the person based on input from a camera.

5. The method of claim 3, further comprising:
receiving a third user interaction via a microphone, the third user interaction representing a voice command; and
updating the video signal based on the third user interaction.

6. The method of claim 1, further comprising:
saving the 3D retail space; and
exporting the 3D retail space to a 3D file format.

7. The method of claim 1, further comprising:
importing a 3D virtual object from at least one of a 3D file format or a physical object by 3D scanning the physical object.

8. The method of claim 1, further comprising:
configuring a gravity property of the virtual retail space.

9. The method of claim 1, further comprising scanning a fixture in a real world to generate the fixture object.

10. A system of designing a retail store space layout comprising:
a three dimensional (3D) virtual retail space viewable through a head mounted virtual reality display, the three dimensional virtual retail space being created from a store footprint corresponding to a retail store space layout;
a fixture object 3D representation or model within the three dimensional virtual retail space, the fixture object 3D representation or model being movable or editable;
a virtual reality input interface that receives an input representing a first user interaction with the fixture object;
an input processing module for processing the first user interaction with the fixture object in the virtual retail space based on the input; and
a video module for sending an updated video signal to the head mounted virtual reality display that displays a result of the first user interaction within the three dimensional virtual retail space;
wherein interacting with the fixture object 3D representation or model within the three dimensional virtual retail space results in the fixture object being placed, removed, or altered.

11. The system of claim 10, wherein:
the virtual reality interaction receives a second user interaction, the second user interaction corresponding to movement of the virtual reality display; and
the video module updates the video signal based on the second user interaction.

12. The system of claim 10, further comprising:
a 3D virtual person that represents at least part of a person wearing the head mounted display within the three dimensional virtual retail space.

13. The system of claim 12, wherein the virtual person includes details of the person based on input from a camera.

14. The method of claim 12, wherein:
the virtual reality input interface receives a third user interaction via a microphone, the third user interaction representing a voice command; and
the video module updates the video signal based on the third user interaction.

15. The system of claim 10, further comprising:
a save module for saving the 3D retail space; and
an export module for exporting the 3D retail space to a 3D file format.

16. A non-transitory computer readable medium stored thereon to design a retail space, the designing comprising:
providing a three dimensional (3D) virtual retail space viewable through a head mounted virtual reality display, the three dimensional virtual retail space being created from a store footprint corresponding to retail store space layout;
providing a fixture object 3D representation or model within the three dimensional virtual retail space, the fixture object 3D representation or model being movable or editable;
receiving a first user interaction with the fixture object 3D representation or model within the three dimensional virtual retail space, the first user interaction resulting in the fixture object being placed, removed, or altered; and
sending an updated video signal to the head mounted virtual reality display that displays a result of the first user interaction within the three dimensional virtual retail space.

17. The non-transitory computer readable medium of claim 16, the designing further comprising:
receiving a second user interaction, the second user interaction corresponding to movement of the virtual reality display; and
updating the video signal based on the second user interaction.

18. The non-transitory computer readable medium of claim 16, the designing further comprising:
providing a 3D virtual person that represents at least part of a person wearing the head mounted display within the three dimensional virtual retail space.

19. The non-transitory computer readable medium of claim 18, wherein the virtual person includes details of the person based on input from a camera.

20. The non-transitory computer readable medium of claim 18, the designing further comprising:
receiving a third user interaction via a microphone, the third user interaction representing a voice command; and
updating the video signal based on the third user interaction.

21. The non-transitory computer readable medium of claim 16, the designing further comprising:
saving the 3D retail space; and
exporting the 3D retail space to a 3D file format.

* * * * *

UNITED STATES PATENT AND TRADEMARK OFFICE
CERTIFICATE OF CORRECTION

PATENT NO. : 9,524,482 B2
APPLICATION NO. : 14/334928
DATED : December 20, 2016
INVENTOR(S) : John Yopp et al.

Page 1 of 1

It is certified that error appears in the above-identified patent and that said Letters Patent is hereby corrected as shown below:

In the Claims

Claim 14, Line 62, delete "method" and insert --system--.

Signed and Sealed this
Twenty-first Day of August, 2018

Andrei Iancu
*Director of the United States Patent and Trademark Office*